United States Patent [19]

Sakaguchi et al.

[11] Patent Number: 4,863,110
[45] Date of Patent: Sep. 5, 1989

[54] MAGNETIC TAPE WINDING METHOD AND APPARATUS

[75] Inventors: Masaaki Sakaguchi; Akihisa Kita; Keisuke Wakatsuki, all of Odawara, Japan

[73] Assignee: Fuji Photo Film Co., Ltd., Japan

[21] Appl. No.: 183,160

[22] Filed: Apr. 19, 1988

Related U.S. Application Data

[63] Continuation of Ser. No. 893,232, Aug. 5, 1986, abandoned.

[30] Foreign Application Priority Data

Aug. 7, 1985 [JP] Japan .................................. 60-173481

[51] Int. Cl.$^4$ ...................... G11B 23/113; G11B 15/32
[52] U.S. Cl. .................. 242/56 R; 242/58.1; 156/159
[58] Field of Search .................. 242/56 R, 56.9, 58.1, 242/58.6; 156/157, 159, 502, 504, 506, 508

[56] References Cited

U.S. PATENT DOCUMENTS 3,737,358  6/1973  King ................................. 242/56 R
3,825,461  7/1974  Gorman ............................ 242/56 R

FOREIGN PATENT DOCUMENTS 61-45306  10/1986  Japan .

Primary Examiner—Stuart S. Levy
Assistant Examiner—Steven M. duBois
Attorney, Agent, or Firm—Gerald J. Ferguson, Jr.

[57] ABSTRACT

In a magnetic tape winding system, an end portion of a magnetic tape, which is cut after the magnetic tape is wound by a predetermined length from a magnetic tape feed roll to a first small wind-up frame, is joined with one end portion of a leader tape having the other end portion engaged with a second small wind-up frame by use of a joining tape. Immediately after the joining, the magnetic tape and the leader tape joined by the joining tape is rewound by a predetermined length around the second small wind-up frame, whereby slack of the tape between the first small wind-up frame and the second small wind-up frame is eliminated without causing the joining section of the magnetic tape with the leader tape to contact the magnetic tape surface at the outermost circumference of the magnetic tape roll wound around the first small wind-up frame.

5 Claims, 4 Drawing Sheets

MAGNETIC TAPE WINDING METHOD AND APPARATUS

This application is a continuation of Ser. No. 893,232, filed Aug. 5, 1986, now abandoned.

BACKGROUND OF THE INVENTION

1. Field of the Invention

This invention relates to a magnetic tape winding method and apparatus for use in a fabrication process of a video cassette tape for VHS system, beta format system or mm system, or an audio cassette tape. This invention particularly relates to a magnetic tape winding method and apparatus for use in a winding process for winding a magnetic tape of a predetermined length from a continuous magnetic tape roll to a small wind-up frame such as a reel, and processing the small wind-up frame so that it may be incorporated into a cassette.

2. Description of the Prior Art

In cassette tape fabrication processes, a magnetic tape winding process has heretofore been conducted generally as described below. A magnetic tape of a predetermined length is wound around a small wind-up frame from a continuous length magnetic tape feed roll, and the magnetic tape is cut and separated from the continuous length magnetic tape feed roll. The cut end of the magnetic tape is made to abut against one end of a leader tape having the other end engaged with a different small wind-up frame, and the two end portions are joined with each other by a joining tape. Then, the magnetic tape is rewound to the small wind-up frame around which the magnetic tape was wound, thereby eliminating the slack of the tape between the two small wind-up frames. The winding process is finished in this manner, and the two small wind-up frames and the magnetic tape wound around one of the two small wind-up frames are maintained in this condition and sent to the next process, i.e. the process for insertion of the tape to a cassette.

In the aforesaid winding process, in order to eliminate the slack of the tape between the two small wind-up frames, the magnetic tape is rewound around the small wind-up frame around which the magnetic tape was wound. At this time, the joining tape which joins the magnetic tape with the leader tape is wound around the small wind-up frame together with the magnetic tape. The joining tape is secured by adhesion to a rear surface of the magnetic tape opposite to the surface coming into contact with a head of a video tape recorder (VTR) or the like. Therefore, when the joining tape is wound around the small wind-up frame, the joining tape overlaps the magnetic tape surface at the outermost circumference of the magnetic tape roll wound around the small wind-up frame.

In this case, an adhesive of the joining tape spreading out of the peripheral portions of the joining tape sticks to the magnetic tape surface at the outermost circumference of the magnetic tape roll. Therefore, when the magnetic tape roll is incorporated into the cassette and the cassette is operated in the VTR or the like, tape drop out arises. Further, the magnetic tape surface stained with the adhesive contacts the head, and stains and clogs the head, thereby adversely affecting the quality of recording and/or reproducing. Particularly, since the magnetic tape surface stained with the adhesive is positioned near the leader tape, drop out arises at the starting section of cassette operation, and the value of the cassette as a commercial article is degraded.

SUMMARY OF THE INVENTION

The primary object of the present invention is to provide a magnetic tape winding method wherein slack of a magnetic tape between a pair of small wind-up frames is eliminated without causing an adhesive to stick to a magnetic tape surface, thereby preventing head staining and clogging with the adhesive.

Another object of the present invention is to provide a magnetic tape winding method which provides a high quality tape cassette.

The specific object of the present invention is to provide an apparatus for carrying out the method.

The present invention provides a magnetic tape winding method which comprises the steps of:

(i) joining an end portion of a magnetic tape, which is cut after said magnetic tape is wound by a predetermined length from a magnetic tape feed roll to a first small wind-up frame, with one end portion of a leader tape having the other end portion engaged with a second small wind-up frame, said joining being effected by use of a joining tape, and (ii) immediately after said joining, winding said magnetic tape and said leader tape joined by said joining tape by a predetermined length around said second small wind-up frame, whereby slack of the tape between said first small wind-up frame and said second small wind-up frame is eliminated without causing the joining section of said magnetic tape with said leader tape joined with said joining tape to contact the magnetic tape surface at the outermost circumference of the magnetic tape roll wound around said first small wind-up frame.

By "winding by a predetermined length around a second small wind-up frame" is meant that, instead of conducting the winding over a length necessary for eliminating slack of the tape between the first small wind-up frame and the second small wind-up frame only by the winding around the first small wind-up frame, said winding over the necessary length is effected also by the winding around the second small wind-up frame. In this case, by "a predetermined length" is meant a length sufficient for preventing the joining section of the magnetic tape with the leader tape joined with the joining tape from coming into contact with the magnetic tape surface positioned at the outermost circumference of the magnetic tape roll of the first small wind-up frame when the tape slack between the first small wind-up frame and the second small wind-up frame is eliminated. Specifically, the winding length by the second small wind-up frame may be the minimum winding length necessary for satisfying the aforesaid "predetermined length", or the tape slack between the first small wind-up frame and the second small wind-up frame may be eliminated only by the winding around the second small wind-up frame without conducting winding around the first small windup frame.

The present invention also provides a magnetic tape winding apparatus comprising:

(i) a winding and cutting mechanism for winding a magnetic tape by a predetermined length from a magnetic tape feed roll to a first small wind-up frame and cutting said magnetic tape, (ii) a joining mechanism for joining an end portion of said magnetic tape cut by said winding and cutting mechanism with one end portion of a leader tape, which has the other end portion engaged with a second small wind-up frame, by use of a joining tape, and (iii) a rewinding mechanism for winding said magnetic tape and said leader tape joined by said joining tape by a predetermined length around said second small wind-up frame immediately after the joining by said joining mechanism, thereby eliminating slack of the tape between said first small wind-up frame and said second small wind-up frame without causing the joining section of said magnetic tape with said leader tape joined with said joining tape to contact the magnetic tape surface at the outermost circumference of the magnetic tape roll wound around said first small wind-up frame.

In the magnetic tape winding apparatus, the rewinding mechanism may be provided with an adjuster for adjusting the length of winding of the magnetic tape and the leader tape joined by the joining tape around the second small wind-up frame.

In the magnetic tape winding method and apparatus of the present invention, since there is no risk of the magnetic tape surface being stained by an adhesive spreading out of the peripheral sections of the joining tape for joining the magnetic tape with the leader tape, it is possible to markedly decrease (by 30% to 50%) tape drop out, particularly drop out at the starting section of a cassette, and to prevent clogging of a head of a VTR or an audio cassette recorder due to the adhesive. Thus it is possible to prevent adverse effects of the adhesive on video signals and audio signals. Therefore, it is possible to provide high quality cassettes, and to minimize troublesome maintenance such as cleaning of the head.

DESCRIPTION OF THE PREFERRED EMBODIMENTS

The present invention will hereinbelow be described in further detail with reference to the accompanying drawings.

Figure 1:
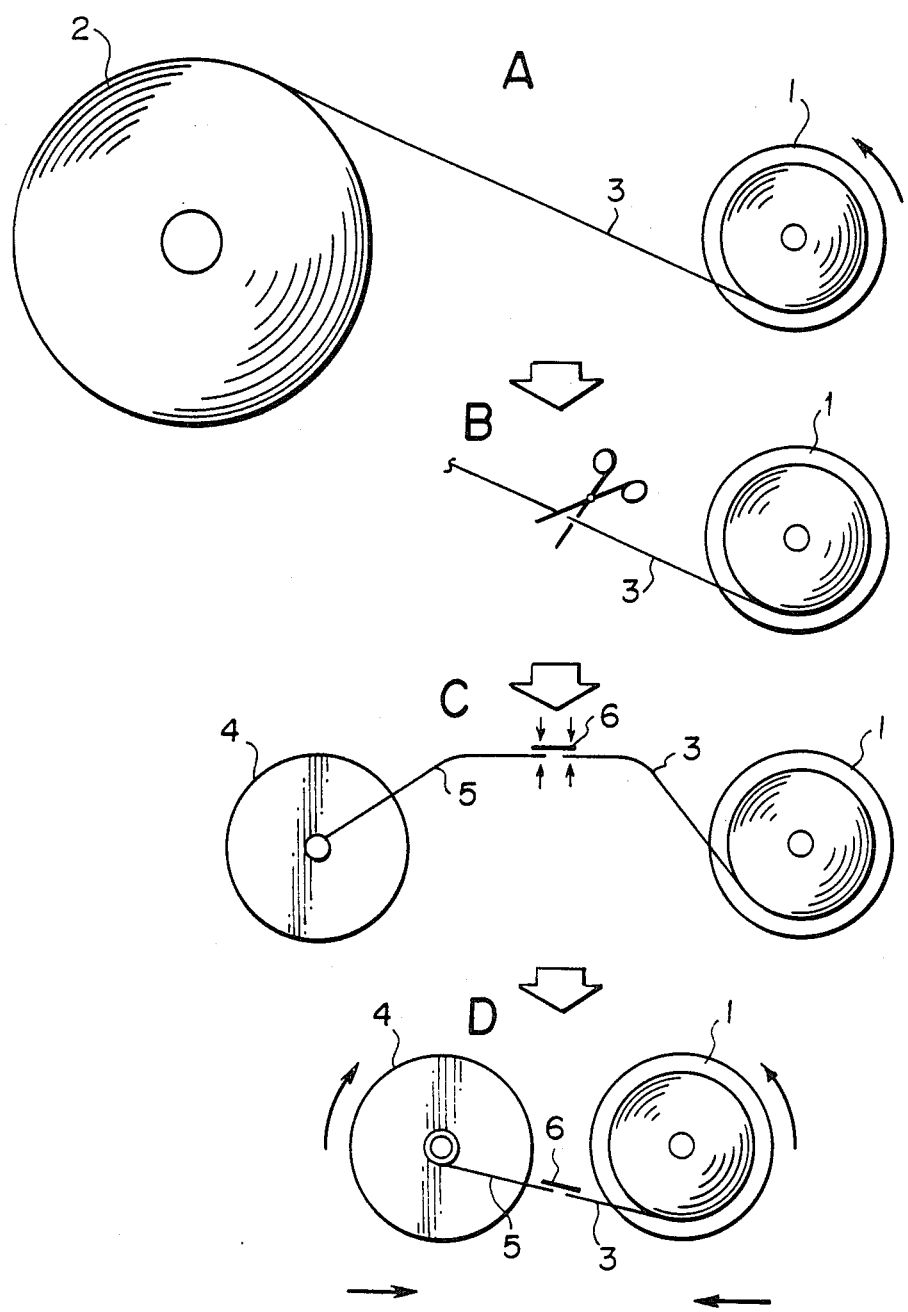
FIG. 1 is a schematic view showing the winding process in an embodiment of the magnetic tape winding method in accordance with the present invention.

Referring to FIG. 1, a small wind-up frame 1 is rotated to wind a magnetic tape 3 from a magnetic tape feed roll 2 to the small wind-up frame 1 (step A). When the magnetic tape 3 has been wound by a predetermined length, the magnetic tape 3 is cut (step B). Then, the cut end portion of the magnetic tape 3 is caused to abut against one end portion of a leader tape 5 having the other end engaged with a small wind-up frame 4, and a joining tape 6 coated with an adhesive is pushed against the abutment section from above thereof (step C).

Thereafter, the joining tape 6 is maintained at the intermediate position between the small wind-up frame 1 and the small wind-up frame 4, the distance between the small wind-up frame 1 and the small wind-up frame 4 is decreased, and the small wind-up frame 1 and the small wind-up frame 4 are rotated to eliminate slack of the magnetic tape 3 and the leader tape 5 between the small wind-up frames 1 and 4 (step D).

Figure 2:
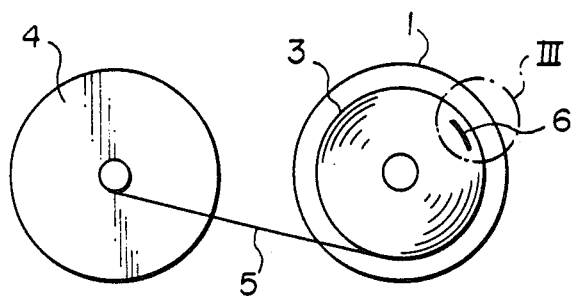
FIGS. 2, 3, 4A and 4B are explanatory views showing the condition of an adhesive sticking to the magnetic tape surface.
Figure 3:
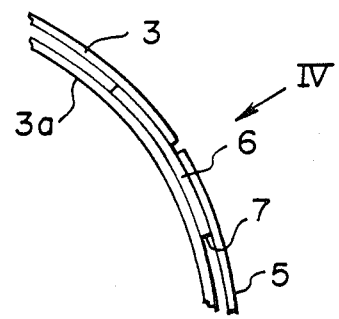
Figure 4A:
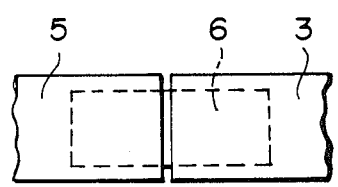
Figure 4B:
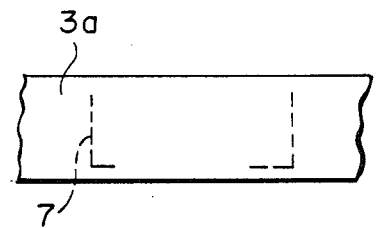

The aforesaid winding process should be conducted so that the joining tape 6 joining the magnetic tape 3 with the leader tape 5 is not wound around the small wind-up frame 1 when slack of the magnetic tape 3 and the leader tape 5 is eliminated while the distance between the small wind-up frames 1 and 4 is decreased. The distance can be decreased by any conventional manner, such as by a slide mechanism including a fixed guide element and at least one slidable attachment element with the slidable attachment element further connected to an adjustable cylinder to be moved thereby. Such a slide mechanism is commonly available from THK Company, Ltd. as part number 1M16UU. At least one of the frames 1 and 4, preferably both, are mounted to a slidable attachment element so that they can be moved relative to each other as illustrate in FIG. 1D. FIG. 2 shows the case where, in the conventional winding method, the joining tape 6 is wound around the small wind-up frame 1. In this case, as shown in FIG. 3 which is an enlarged view showing the section III in FIG. 2, the joining tape 6 overlaps a magnetic tape 3a positioned at the outermost circumference of the roll of the magnetic tape 3 wound around the small wind-up frame 1, and an adhesive 7 spreading out of the peripheral sections of the joining tape 6 sticks to the surface of the magnetic tape 3a. FIGS. 4A and 4B are views taken in the direction of IV of FIG. 3, and show the relationship between the joining tape 6 which joins the magnetic tape 3 with the leader tape 5 as shown in FIG. 4A and the adhesive 7 sticking to the magnetic tape 3a at the outermost circumference of the roll of the magnetic tape 3 as shown in FIG. 4B. The adhesive 7 spreads out of the peripheral sections of the joining tape 6 when the joining tape 6 is pulled in two directions by the magnetic tape 3 and the leader tape 5 during the winding operation, when the joining tape 6 is cut or punched to a predetermined size, and when the joining tape 6 is pushed against the end portions of the magnetic tape 3 and the leader tape 5.

Figure 5:
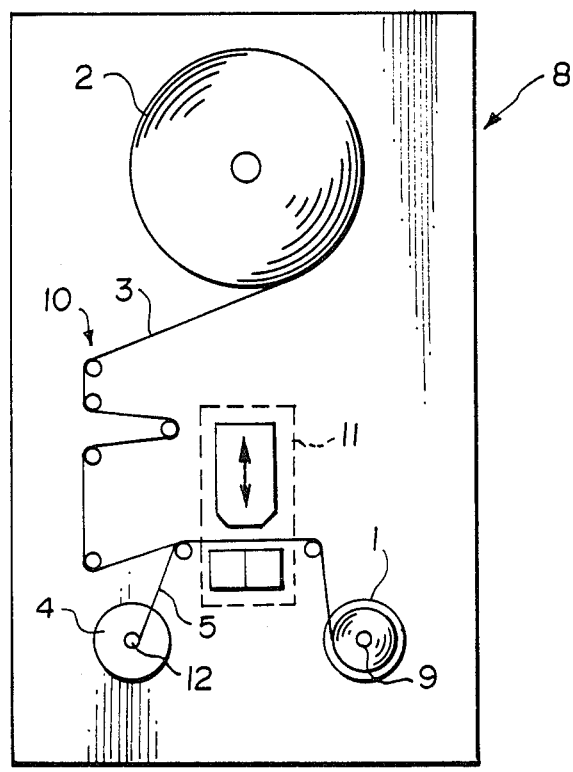
FIG. 5 is a front view showing an embodiment of the magnetic tape winding apparatus in accordance with the present invention.

FIG. 5 is a front view showing a magnetic tape winding apparatus 8 used in the winding process shown in FIG. 1.

Figure 6:
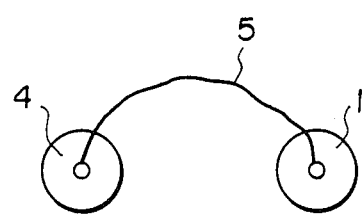
FIG. 6 is a front view showing the leader tape prior to setting on the apparatus of FIG. 5.

The small wind-up frame 1 is supported by a motor driven shaft 9 in the winding apparatus 8. When the motor driven shaft 9 is rotated by a motor (not shown), the magnetic tape 3 is wound from the magnetic tape feed roll 2 to the small wind-up frame 1 via a pass system 10. When the magnetic tape 3 has been wound by a predetermined length around the small wind-up frame 1, rotation of the shaft 9 is stopped, and the magnetic tape 3 is cut at a joining mechanism section 11. The cut end portion of the magnetic tape 3 is caused to abut against an end portion of the leader tape 5 positioned in advance at the joining mechanism section 11, and a joining tape (not shown) is pushed against the abutment section from above thereof. The leader tape 5 is positioned in advance at the joining mechanism section 11 since prior to the start of the tape winding operation a leader tape 5 having one end engaged with the small wind-up frame 1 and the other end engaged with the small wind-up frame 4 as shown in FIG. 6 is positioned and cut at the joining mechanism section 11 prior to the winding of the magnetic tape 3 around the small wind-up frame 1, and the leader tape 5 on the side of the small wind-up frame 4 is maintained in the cut form.

Figure 7:
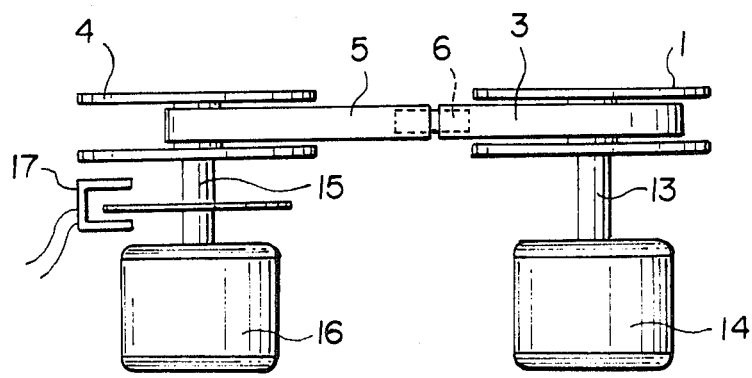
FIG. 7 is a schematic view showing the rewinding mechanism for the magnetic tape and the leader tape, which may be incorporated in the apparatus of FIG. 5.

FIG. 7 shows a rewinding mechanism for eliminating slack of the magnetic tape 3 and the leader tape 5, which has been joined at the joining mechanism section 11, between the small wind-up frames 1 and 4.

A shaft 13 on the side of the small wind-up frame 1 is provided with a brake mechanism 14, and a rewinding motor 16 and a detector 17 for detecting the rewinding length are provided at a shaft 15 on the side of the small wind-up frame 4. The brake mechanism 14 is constituted by a torque motor or the like, and tensions the magnetic tape 3 and the leader tape 5 prior to the rewinding conducted by the rewinding motor 16. At this time, winding to the small wind-up frame 1 may be conducted with the brake mechanism 14 for a predetermined short time. Also, instead of providing the shaft 13 with the brake mechanism 14, it may be constituted as a fixed shaft for preventing the small wind-up frame 1 from rotating. The rewinding motor 16 for rewinding the magnetic tape 3 and the leader tape 5 by a predetermined length to the small wind-up frame 4 may be constituted by an ordinary direct current motor, or an ordinary alternating current motor. However, the rewinding motor 16 should preferably be constituted by a pulse motor to facilitate control of the rewinding length. In this case, the detector becomes unnecessary. It is also possible to constitute the shafts 9 and 12 shown in FIG. 5 so that they also act as the shafts 13 and 15 of the rewinding mechanism. Or, the shafts 13 and 15 of the rewinding mechanism may be positioned respectively near the shafts 9 and 12, for example, in the front thereof, so that the small wind-up frames 1 and 4 removed from the shafts 9 and 12 may directly be mounted on the shafts 13 and 15.

Figure 8:
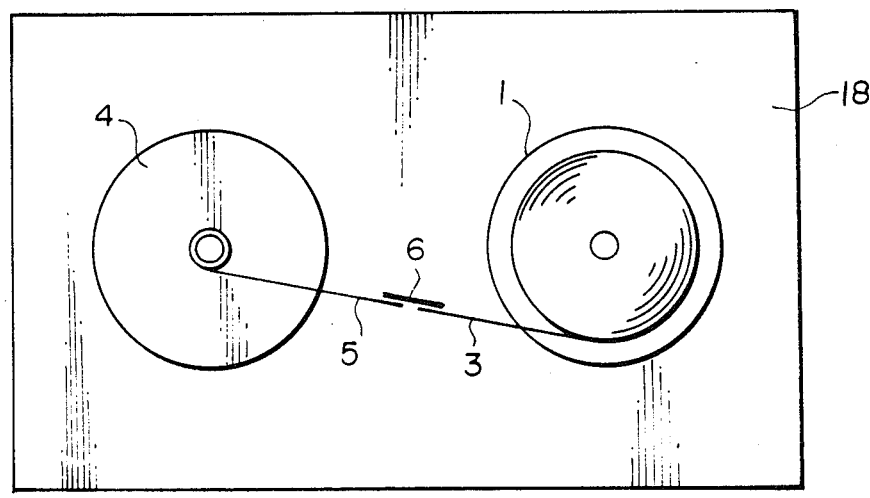
FIG. 8 is a schematic view showing the magnetic tape after completion of winding together with a pallet.

As described above, the joining section of the magnetic tape 3 with the leader tape 5 is maintained at the intermediate position between the small wind-up frames 1 and 4, the distance between the small wind-up frames 1 and 4 is decreased, and tape slack between the small wind-up frames 1 and 4 is eliminated by the rewinding mechanism. Then, the magnetic tape 3 and the leader tape 5 are placed on a pallet 18 as shown in FIG. 8, and conveyed to the process for inserting the tape to a cassette. The pallet 18 is generally provided with a brake mechanism for fixing the small wind-up frames 1 and 4 so that they do not rotate. However, such a brake mechanism may be omitted when the distance between the winding apparatus 8 shown in FIG. 5 and a tape inserting apparatus for inserting the magnetic tape to a cassette is short. Also, when the tape inserting apparatus is present near the winding apparatus 8, tape insertion may be directly conducted from the rewinding mechanism as shown in FIG. 7 to the cassette. In this case, it becomes unnecessary to use the pallet 18.

The magnetic tape 3 thus placed on the pallet 18 is formed into a predetermined shape at the process for inserting the tape into the cassette, and inserted into the cassette. In VHS cassettes, 8 mm video cassettes, or the like, the length of the leader tape 5 is fixed. Therefore, after the magnetic tape 3 is inserted into the cassette, the joining tape 6 does not contact the tape roll around the small wind-up frame 1 even though the small wind-up frames 1 and 4 are rotated.

We claim:

1. A magnetic tape winding method which comprises the steps of:
   (i) joining an end portion of a magnetic tape, which is cut after said magnetic tape is wound by a predetermined length from a magnetic tape feed roll to a first small wind-up frame, with one end portion of a leader tape having the other end portion engaged with a second small wind-up frame, said joining being effected by the use of a joining tape, and
   (ii) immediately after said joining, winding said magnetic tape and said leader tape joined by said joining tape by a predetermined length around said second small wind-up frame, whereby slack of the tape between said first wind-up frame and said second wind-up frame is eliminated without causing the joining section of said magnetic tape with said leader tape joined with said joining tape to contact the magnetic tape surface at the outermost circumference of the magnetic tape roll wound around said first small wind-up frame, wherein the tape slack is wound around the second wind-up frame, while the joining tape is maintained at an intermediate position between the first and second frames and one of a plurality of wind-up motors is shifted towards another of said plurality of said wind-up motors.

2. A magnetic tape winding apparatus comprising:
   (i) a winding and cutting mechanism for winding a magnetic tape by a predetermined length from a magnetic tape feed roll to a first small wind-up frame and cutting said magnetic tape,
   (ii) a joining mechanism for joining an end portion of said magnetic tape cut by said winding and cutting mechanism with one end portion of a leader tape, which has the other end portion engaged with a second small wind-up frame, by use of a joining tape,
   (iii) means for shifting one of a plurality of wind-up motors, and
   (iv) a rewinding mechanism for winding said magnetic tape and said leader tape joined by said joining tape by a predetermined length around said second wind-up frame immediately after the joining by said joining mechanism, thereby eliminating slack of the tape between said first small wind-up frame and said second wind-up frame without causing the joining section of said magnetic tape with said leader tape joined with said joining tape to contact the magnetic tape surface at the outermost circumference of the magnetic tape roll wound around said first small wind-up frame.

3. An apparatus as defined in claim 2 wherein said rewinding mechanism is provided with an adjuster for adjusting the length of winding of said magnetic tape and said leader tape, which are joined with said joining tape, around said second small wind-up frame.

4. An apparatus as defined in claim 2 wherein said rewinding mechanism is provided with a rewinding pulse motor.

5. An apparatus as defined in claim 2 wherein said rewinding mechanism is provided with a brake mechanism for tensioning said magnetic tape and said leader tape joined with said joining tape prior to rewinding.

* * * * *